United States Patent [19]

Harvey

[11] Patent Number: 4,903,061
[45] Date of Patent: Feb. 20, 1990

[54] METERING CONTROL MECHANISM

[75] Inventor: Donald M. Harvey, Webster, N.Y.

[73] Assignee: Eastman Kodak Company, Rochester, N.Y.

[21] Appl. No.: 349,478

[22] Filed: May 9, 1989

[51] Int. Cl.⁴ .............................................. G03B 1/00
[52] U.S. Cl. ................................................... 354/213
[58] Field of Search ...................... 354/170, 173.1, 213

[56] References Cited

U.S. PATENT DOCUMENTS

| Re. 32,558 | 12/1987 | Chan | 354/173.1 |
|---|---|---|---|
| 41,574 | 2/1964 | Groel | 192/43.1 |
| 2,591,417 | 4/1952 | Frye | 354/170 |
| 2,728,281 | 12/1955 | Mihalyi | 354/213 |
| 2,778,476 | 1/1957 | Engleson et al. | 53/436 |
| 2,784,820 | 3/1957 | Clark | 192/43 |
| 2,931,283 | 4/1960 | Schreiber | 354/213 |
| 3,232,196 | 2/1966 | Sapp et al. | 354/172 |
| 3,463,280 | 8/1969 | Hoffman et al. | 192/43.1 |
| 3,479,940 | 11/1969 | Nerwin | 354/214 |
| 3,665,830 | 5/1972 | Maeda | 354/213 |
| 4,202,617 | 5/1980 | Urans et al. | 354/173.1 |
| 4,223,990 | 9/1980 | Edwards | 354/213 X |
| 4,295,713 | 10/1981 | Edwards | 352/235 |
| 4,303,325 | 12/1981 | Seely | 354/212 |
| 4,342,509 | 8/1982 | Wakabajashi et al. | 354/173.1 |
| 4,423,943 | 1/1984 | Gold | 354/275 X |
| 4,497,555 | 2/1985 | Akiyana | 354/173.1 |
| 4,586,801 | 5/1986 | Nishizawa et al. | 354/213 X |
| 4,855,773 | 8/1989 | Harvey | 354/173.1 |

Primary Examiner—L. T. Hix
Assistant Examiner—Brian W. Brown
Attorney, Agent, or Firm—Roger A. Fields

[57] ABSTRACT

An expose-on rewind type camera is used with a film cassette having a film spool which can be rotated to unwind a filmstrip off the spool to thrust a non-protruding film leader to the exterior of the cassette, to enable the filmstrip to be prewound continuously onto a take-up spool in the camera, and alternatively to rewind the filmstrip into the cassette a single frame increment following each exposure in the camera. During the prewind mode of the camera, a metering pawl is retained out of the way of the filmstrip to prevent the pawl from engaging the filmstrip at any of its metering perforations. The metering pawl is allowed to contact the filmstrip in response to change-over from the prewind mode to the rewind mode of the camera, to permit the pawl to meter the filmstrip a single frame increment preparatory to each exposure.

5 Claims, 13 Drawing Sheets

METERING CONTROL MECHANISM

CROSS-REFERENCE TO A RELATED APPLICATION

Reference is made to commonly assigned copending application Ser. No. 221,955, U.S. Pat. No. 4,855,773 entitled MOTOR-DRIVEN FILM TRANSPORT APPARATUS, and filed Jul. 20, 1988, in the name of Donald M. Harvey.

Application Ser. No. 221,955 is incorporated in this application by reference.

BACKGROUND OF THE INVENTION

1. Field of the Invention

The invention relates generally to the field of photography, and particularly to a metering control mechanism for a photographic camera.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2⅜ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35 mm camera to engage the protruding leader portion to draw the filmstrip out of the shell. Typically, the leader portion includes a series of take-up perforations located along the same longitudinal edge as a row of similarly spaced metering perforations in the imaging portion of the filmstrip, as in U.S. Pat. No. 3,665,830, or a hole proximate a forward edge of the leader portion, as in U.S. Pat. Nos. 4,295,713 and 4,303,325, for engagement with a corresponding tooth of a take-up spool in the camera.

A 35 mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera. In order to attach the leader portion to the film advancing device, a row of metering perforations in the imaging portion of the filmstrip is continued along the leader portion.

THE CROSS-REFERENCED APPLICATION

Cross-referenced application Ser. No. 221,955 discloses a film cassette in which a film spool can be rotated to unwind a filmstrip off the spool to thrust a non-protruding film leader to the exterior of the cassette, to enable the filmstrip to be prewound continuously onto a take-up spool in a camera, and alternatively to rewind the filmstrip into the cassette a single frame increment following each film exposure in the camera. A film transport apparatus of the camera includes a bi-directional drive member having respective positions for effecting alternate one-way driving connections with the film spool of the cassette to rotate the spool in the unwinding and rewinding directions in accordance with the rotational direction of a single bi-directional drive motor. During advance of the film leader from the cassette to the take-up spool of the camera, the take-up spool is motor-driven at a faster speed than the film spool of the cassette is rotated. When the film leader is secured to the take-up spool, the drive member permits the film spool to be overdriven by the resulting pull of the filmstrip exerted at the film spool. During rewinding of the filmstrip onto the film spool, the take-up spool is uncoupled from the drive motor to allow the film spool to serve as the only means for film movement.

SUMMARY OF THE INVENTION

According to the invention, there has been devised a metering control mechanism for a photographic camera to be used with a film cassette in which a film spool is rotatable to unwind a filmstrip off the spool to thrust a non-protruding leader portion of the filmstrip from the cassette, to enable the leader portion to be moved along a film path to film take-up means in the camera, and alternatively to rewind the filmstrip onto the spool to draw the leader portion along the same path back into the cassette, wherein the camera includes a motorized film drive apparatus operable in a prewind mode for rotating the film spool to unwind the filmstrip off the spool and in a rewind mode for rotating the film spool to rewind the filmstrip onto the spool, characterized in that the metering control mechanism comprises:

a metering pawl adapted to engage the filmstrip at respective metering perforations preparatory to each exposure;

actuation means for moving the metering pawl into the film path to permit the pawl to engage the filmstrip at one of its metering perforations; and control means responsive to operation of the film drive apparatus in the prewind mode for removing the metering pawl from the film path to prevent the pawl from engaging the filmstrip at one of its metering perforations, and responsive to operation of the film drive apparatus in the rewind mode for allowing the metering pawl to be moved into the film path to permit the pawl to engage the filmstrip at one of its metering perforations.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

THE FILM CASSETTE

Figure 1:
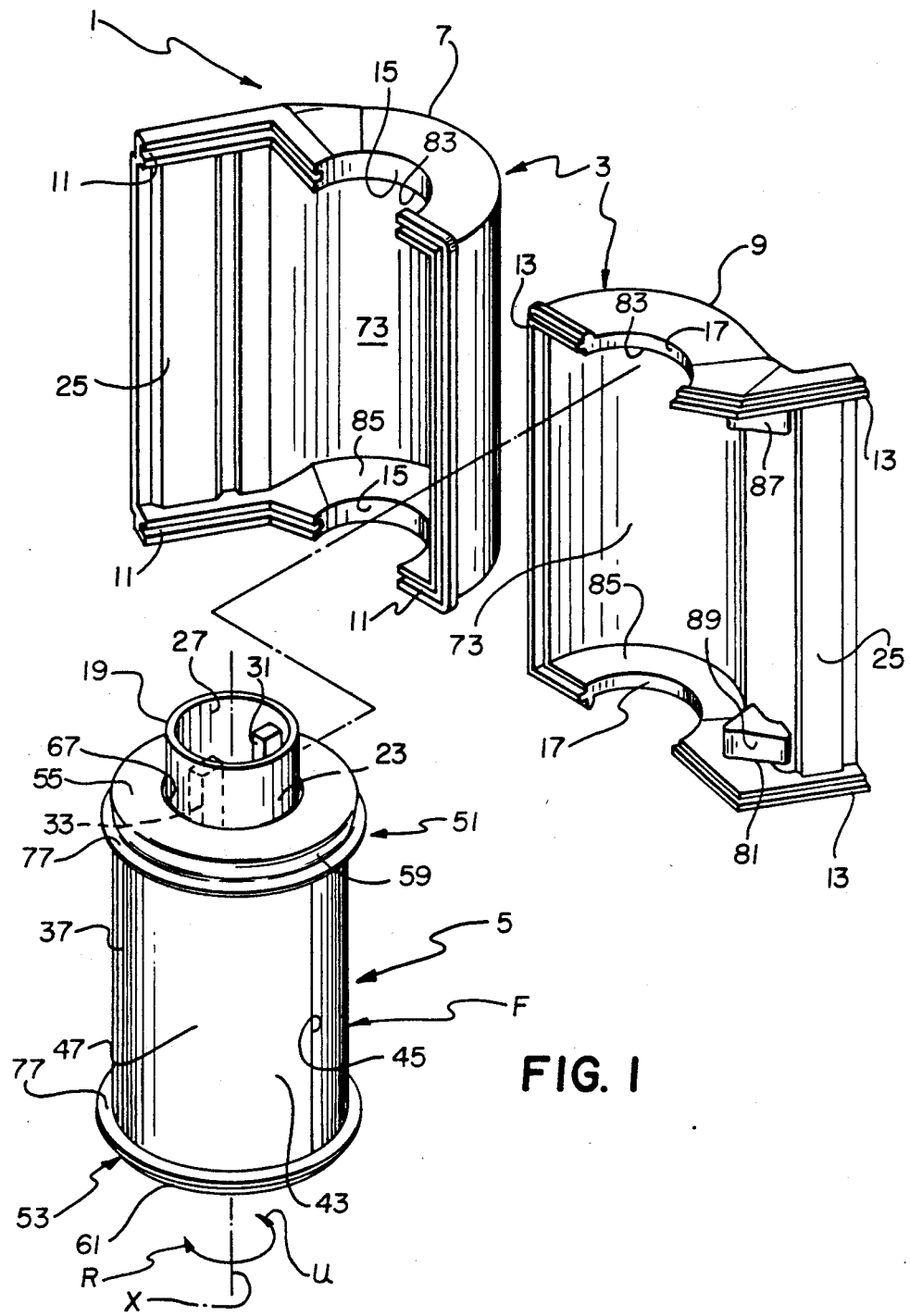
FIG. 1 is an exploded perspective view of a film cassette having a non-protruding film leader, as disclosed in the cross-referenced application.
Figure 2:
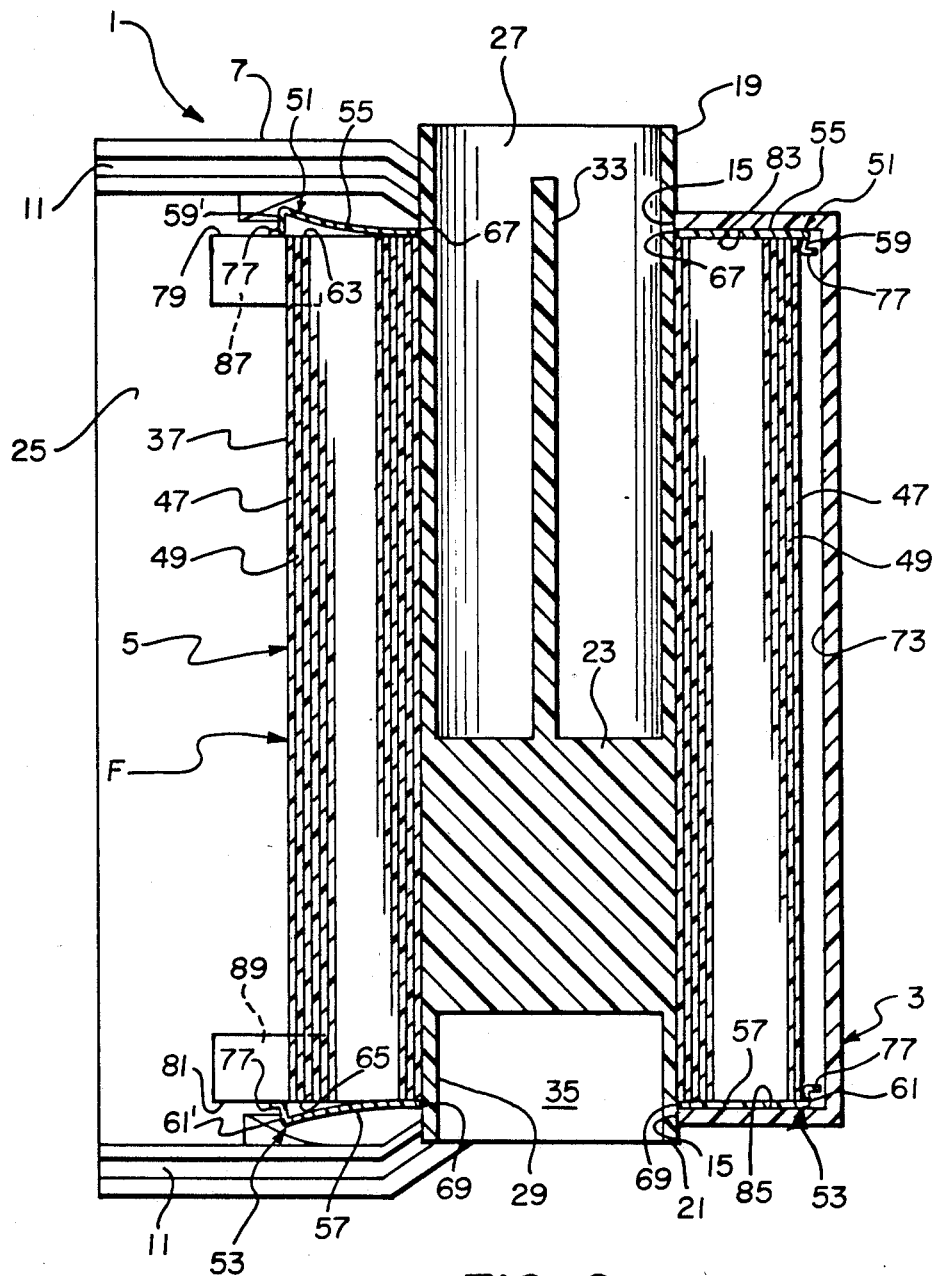
FIG. 2 is an elevation view in cross-section of the film cassette.
Figure 3:
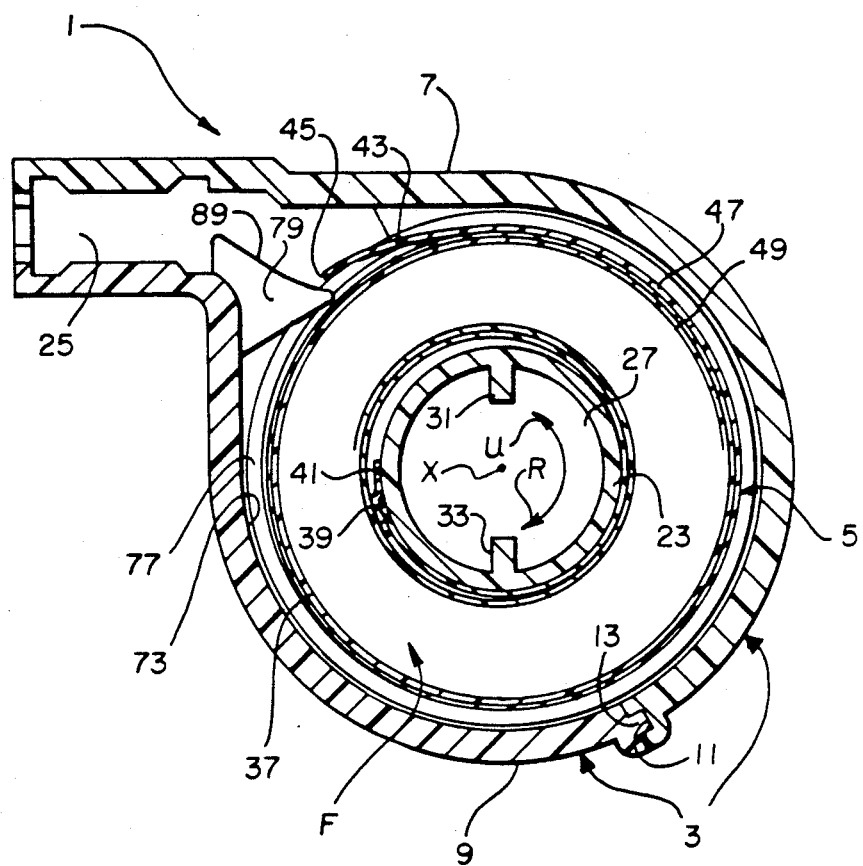
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction R opposite to the unwinding direction.

A film roll 37 comprising a convoluted 35 mm filmstrip F having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has leading or forward end 45 and comprises 2-3 convolutions of the film roll 37. One of these leader convolutions is the outermost convolution 47 and another of them is the next inward succeeding convolution 49.

Figure 4:
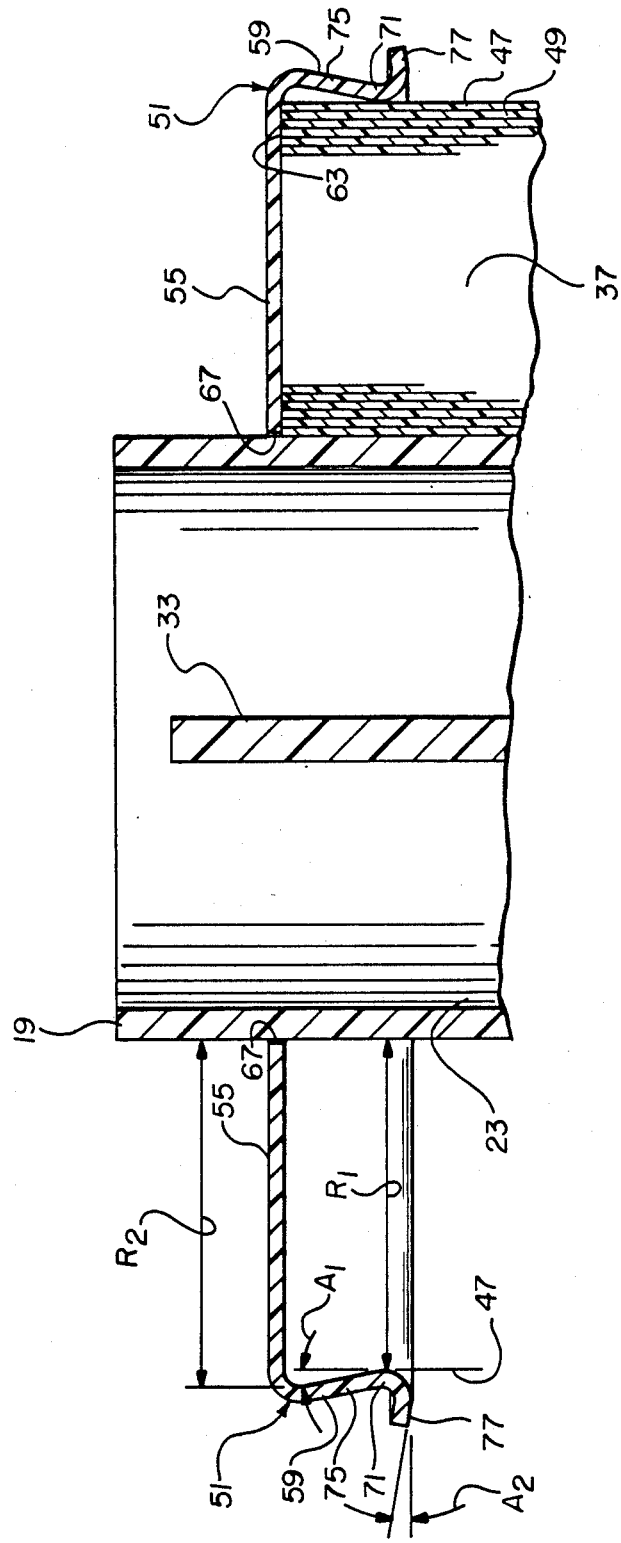
FIG. 4 is an elevation view in cross-section of one of a pair of flanges associated with a film spool within the cassette shell.
Figure 5:
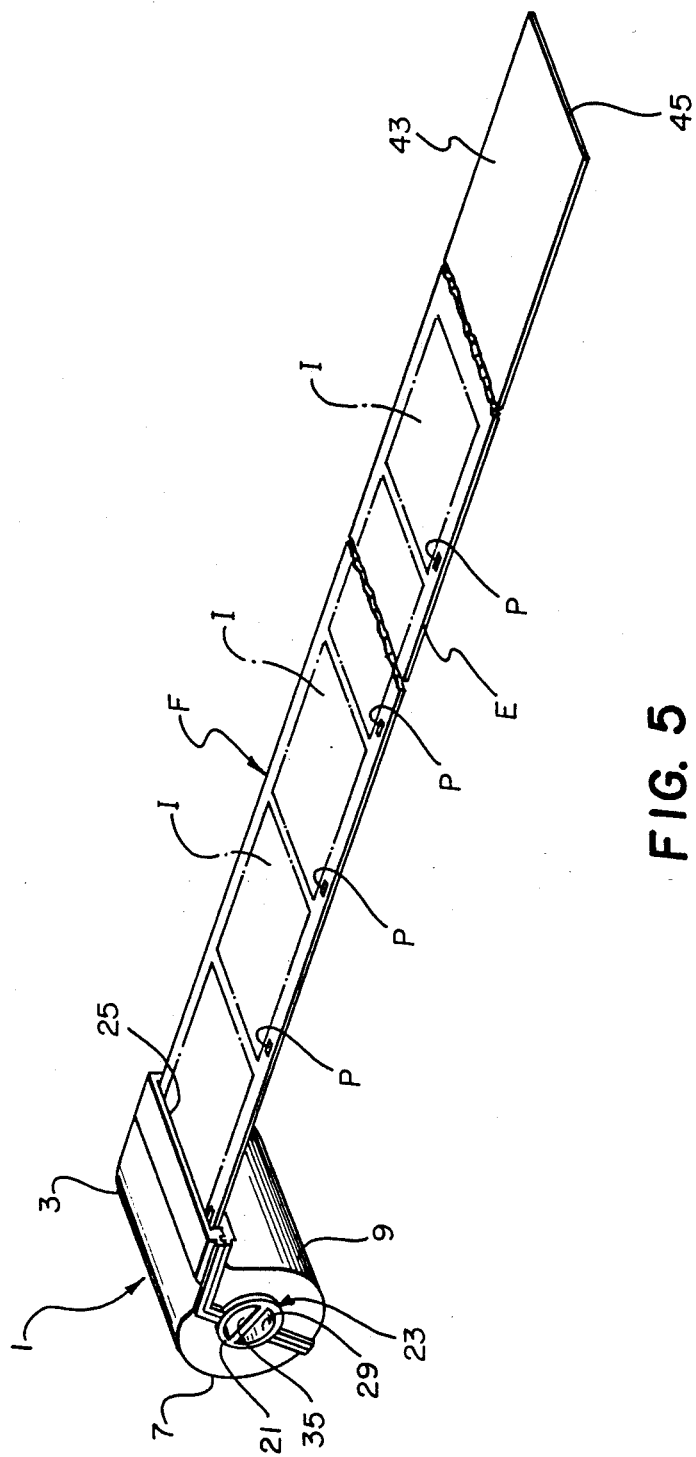
FIG. 5 is a perspective view of the film cassette, showing substantially the entire length of the filmstrip including the film leader advanced to the exterior of the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47. The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction R opposite to the unwinding direction U, the filmstrip will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

THE PHOTOGRAPHIC CAMERA - FILM TRANSPORT APPARATUS

Figure 6:
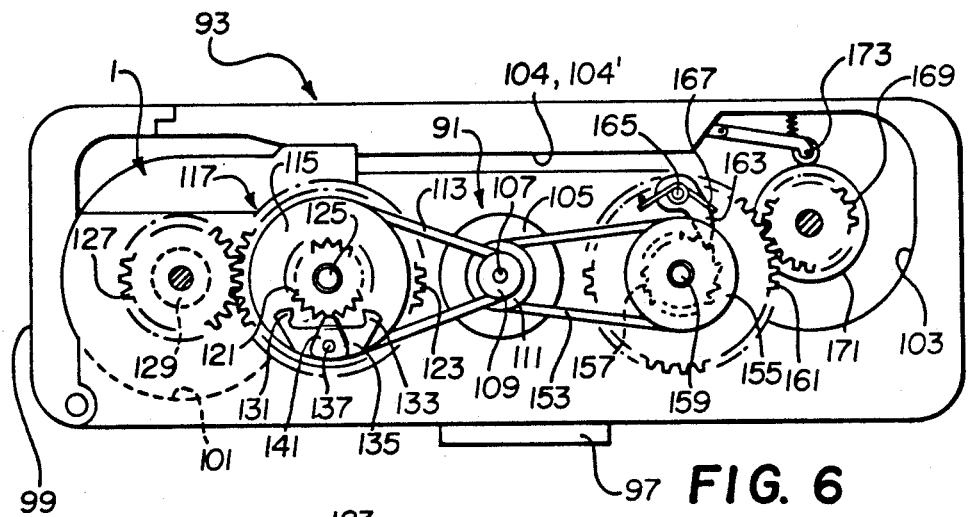
FIG. 6 is a bottom plan view of motor-driven film transport apparatus in a photographic camera to be used with the film cassette depicted in FIGS. 1-5, as disclosed in the cross-referenced application.
Figure 7:
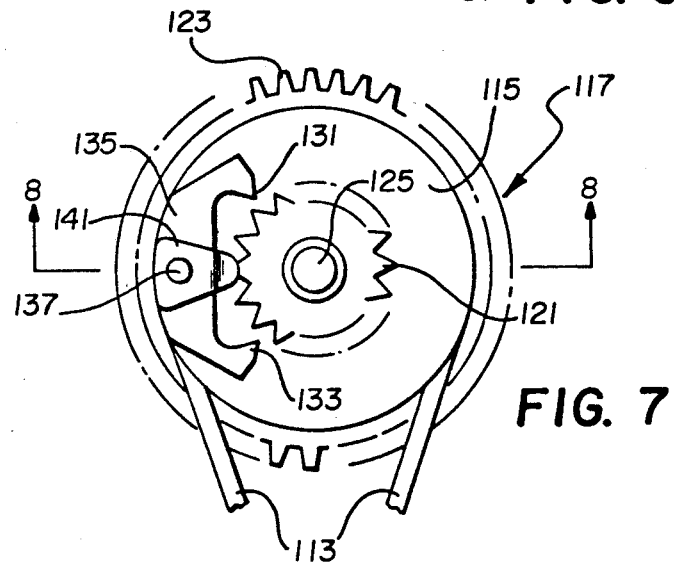
FIG. 7 is a bottom plan view of a bi-directional film drive mechanism of the film transport apparatus.
Figure 8:
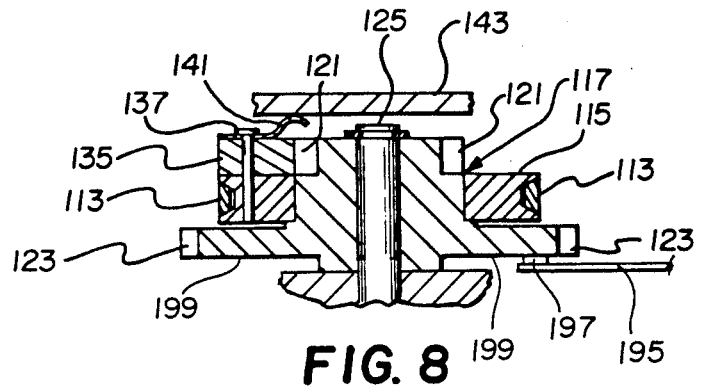
FIG. 8 is a cross-sectional view of the bi-directional film drive mechanism as viewed in the direction of the arrows 8, 8 in FIG. 7.

Referring now to FIGS. 6-8, an improved motor-driven film transport apparatus 91 for a photographic camera 93 is depicted for use with the film cassette 1. The camera body 95 is shown with a front lens shield 97, a side door 99 opening to a cassette-receiving chamber 101, a separate film take-up chamber 103, and a film guide channel 104 interconnecting the two chambers to define a film guide path 104' from one chamber to the other one. A conventional bi-directional drive motor 105 which can change its rotational direction by switching the current flow direction to the motor, includes a drive shaft 107. A pair of smaller and larger radius drive pulleys 109 and 111 are coaxially fixed to the drive shaft 107. The smaller drive pulley 109 is drivingly connected via an endless belt 113 to a driven pulley 115, concentrically disposed loosely about a multiple gear unit 117. The multiple gear unit 117 has a smaller circular gear portion 121 and a larger circular gear portion 123, and is mounted for rotation on an idler shaft 125. The larger circular gear portion 123 of the multiple gear unit 117 is arranged to continually engage a gear wheel 127 having an integral coaxial rotation hub 129 which projects from the bottom of the cassette-receiving chamber 101 to engage the two keying ribs 31 and 33 formed with the spool core 23 of the film cassette 1. The smaller circular gear portion 121 of the multiple gear unit 117 is intended to be drivingly engaged by either one of a pair of separate pawl ends 131 and 133 of a bi-directional drive member 135. The drive member 135 is mounted atop the driven pulley 115 via a pivot pin 137, disposed parallel to the idler shaft 125. When the multiple gear unit 117 is rotated in a counter-clockwise direction 139 about the idler shaft 125 as viewed in FIG. 9, a thin leaf spring 141 fixed to the drive member 135 at the pivot pin 137 will drag along a plate-like section 143 of the camera body 95 to swing the drive member about the pivot pin until its pawl end 133 drivingly engages the smaller circular gear portion 121 of the multiple gear unit. See FIGS. 8 and 9. Conversely, when the multiple gear unit 117 is rotated in a clockwise direction 145 about the idler shaft 125 as viewed in FIG. 11, the leaf spring 141 will drag along the plate-like section 143 to swing the drive member 135 about the pivot pin 137 until its pawl end 131 drivingly engages the smaller circular gear portion 121 of the multiple gear unit. Thus, energization of the drive motor 105 with a current flow direction to rotate the smaller drive pulley 109 in a counter-clockwise direction 139' as viewed in FIG. 9, will swing the drive member 135 to position its pawl end 133 in driving engagement with the smaller circular gear portion 121 to in turn rotate the larger circular gear portion 123 in the counter-clockwise direction 139, and thereby will rotate the gear wheel 127 in a clockwise direction 147 to in turn rotate the spool core 23 of the the film cassette 1 in the unwinding direction U to thrust the non-protruding film leader 43 from the film cassette (as described in detail above) into the film guide channel 104. Energization of the drive motor 105 with a current flow direction to rotate the smaller drive pulley 109 in a clockwise direction 145' as viewed in FIG. 11, will swing the drive member 135 to position its pawl end 131 in driving engagement with the smaller circular gear portion 121 to in turn rotate the larger circular gear portion 123 in the clockwise direction 145, and thereby will rotate the gear wheel 127 in a counter-clockwise direction 151 to in turn rotate the spool core 23 of the film cassette 1 in the rewinding direction R to return the film leader 43 to the film cassette.

The larger drive pulley 111 is drivingly connected via an endless belt 153 to a driven pulley 155 which, with an integral circular gear portion 157, is mounted for rotation on an idler shaft 159. A gear wheel 161 is concentrically disposed loosely about the idler shaft 159, and is normally coupled to the pulley gear portion 157 by a pawl member 163 for concurrent rotation with the driven pulley 155 in the counter-clockwise direction 139" as viewed in FIG. 9. The pawl member 163 is mounted atop the gear wheel 161 via a pivot pin 165, disposed parallel to the idler shaft 159, and is urged by a torque spring 167 to releasably engage the pulley gear portion 157. The gear wheel 161 continually engages a gear wheel 169 which is coaxially fixed to a rotatably mounted conventional take-up drum or spool 171 in the take-up chamber 103. Film engagement means, not shown, located on the take-up spool 171, and a spring-urged pressure roller 173 serve to facilitate securing of the film leader 43 to the take-up spool. When the drive motor 105 is energized with a current flow direction to rotate the larger drive pulley 111 in the counter-clockwise direction 139' as viewed in FIG. 9, the pulley gear portion 157 will be rotated in the counter-clockwise direction 139" to orbit the pawl member 163 in the same direction to in turn similarly rotate the gear wheel 161, and thereby rotate the gear wheel 169 in a clockwise direction 147' to similarly rotate the take-up spool 171. Due to the gear and pulley ratios, the pulley gear portion 157 will be rotated at a sufficient speed which ensures that the take-up spool 171 will take-up the film leader 43 faster than the spool core 23 of the film cassette 1 can be rotated to thrust the film leader from the film cassette. As a result, the film pull or tension exerted at the spool core 23 because of take up of the film leader 43 at the take-up spool 171 will cause the smaller circular gear portion 121 of the multiple gear unit 117 to be overdriven in the counter-clockwise direction 139, whereupon the smaller circular gear portion will disengage from the pawl end 133 of the bi-directional drive member 135 as shown in FIG. 10 to, in effect, uncouple the drive motor 105 from the spool core 23. When the drive motor 105 is energized with a current flow direction to rotate the larger drive pulley 111 in the clockwise direction 145' as viewed in FIG. 11, the pulley gear portion 157 will be rotated in the clockwise direction 145". However, the pulley gear portion 157 will not orbit the pawl member 163 as in the previous instance, because of the inclination of the gear teeth. See FIG. 11. As a result, the pawl member 163 cannot serve to rotate the gear wheel 161, and the take-up spool 11 will only be rotated in a counter-clockwise direction 151' because of the film pull exerted at the take-up spool as the filmstrip F is rewound onto the spool core 23 of the film cassette 1.

Figure 9:
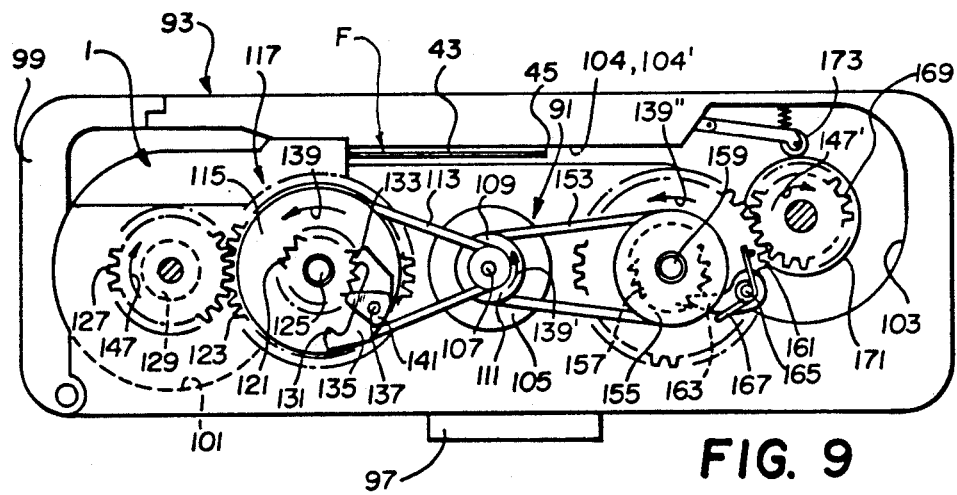
FIGS. 9 and 10 are bottom plan views of the film transport apparatus, showing operation of the bi-directional film drive mechanism in respective modes for rotating the film spool of the film cassette in an unwinding direction and for allowing the spool to be film-driven when the film leader is secured to a take-up spool.
Figure 10:
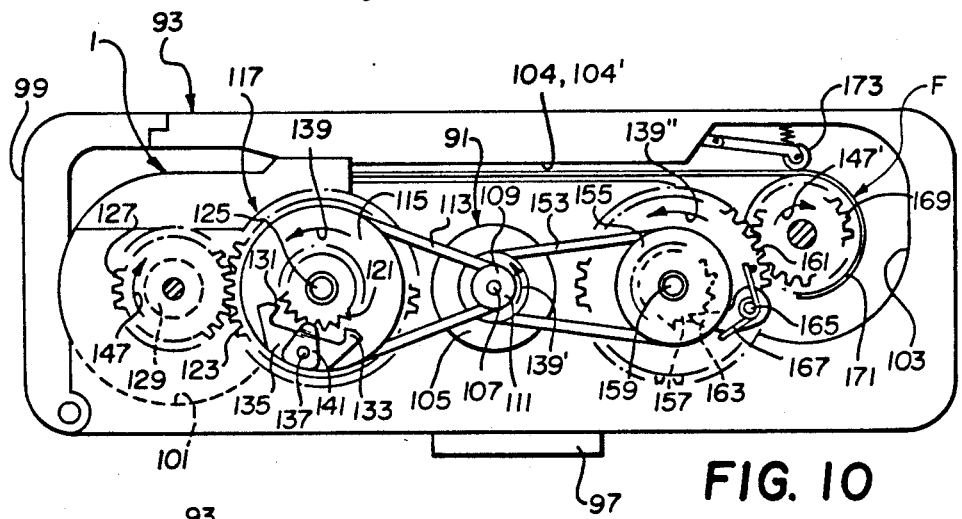
Figure 11:
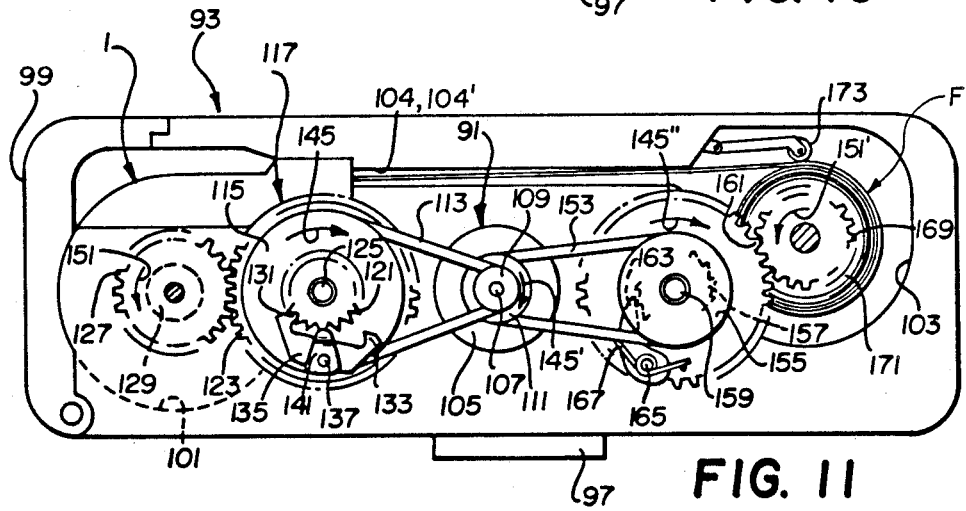
FIG. 11 is a bottom plan view of the film transport apparatus, showing operation of the bi-directional film drive mechanism in a mode for rotating the film spool in a rewinding direction.

It will be appreciated that the bi-directional drive member 135 has respective positions, shown in FIGS. 9 and 11, for effecting alternate one-way driving connections with the spool core 23 to rotate the spool core in the unwinding and rewinding directions U and R in accordance with the rotational direction of the drive motor 105. During advance of the film leader 43 from the film cassette 1 along the film path 104' (defined by the film guide channel 104) to the take-up spool 171, the take-up spool is motor-driven at a faster speed than the spool core 23 is rotated. When the film leader 43 is secured to the take-up spool 173, the drive member 135 permits the spool core to be overdriven by the resulting pull of the filmstrip F exerted at the spool core. During rewinding of the filmstrip F along the film path 104' back onto the spool core 23, the take-up spool 173 is uncoupled from the drive motor 105 to allow the spool core to serve as the only means for film movement.

THE PHOTOGRAPHIC CAMERA - METERING CONTROL MECHANISM

As shown in FIG. 7, the filmstrip F except for the film leader 43 has a longitudinal row of conventional metering perforations P adjacent one longitudinal edge E of the filmstrip. The metering perforations P number one per frame (imaging area) I on the filmstrip F and, according to custom, they enable the filmstrip F to be moved exactly one frame at a time by the film transport apparatus 91. Preferably, the film transport apparatus 91 is actuated to prewind substantially the entire length of the filmstrip F from the film cassette 1 along the film path 104' and onto the take-up spool 17' continuously without exposing the filmstrip, and to rewind the filmstrip back along the same path one frame I at a time into the cassette after each exposure. Thus, the camera 93 is commonly referred to as an "expose-on-rewind" type camera.

Figure 12:
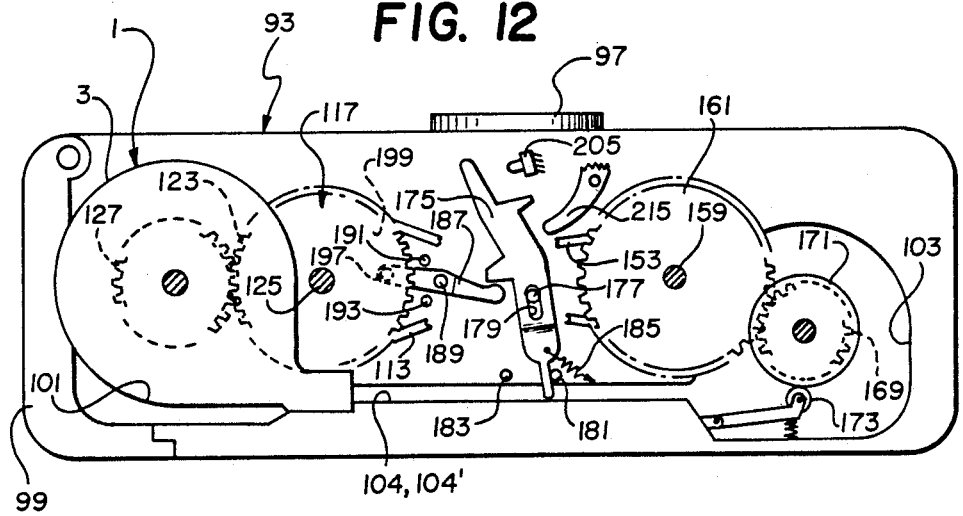
FIG. 12 is a bottom plan view of a metering control mechanism in the camera, according to a preferred embodiment of the invention.
Figure 14:
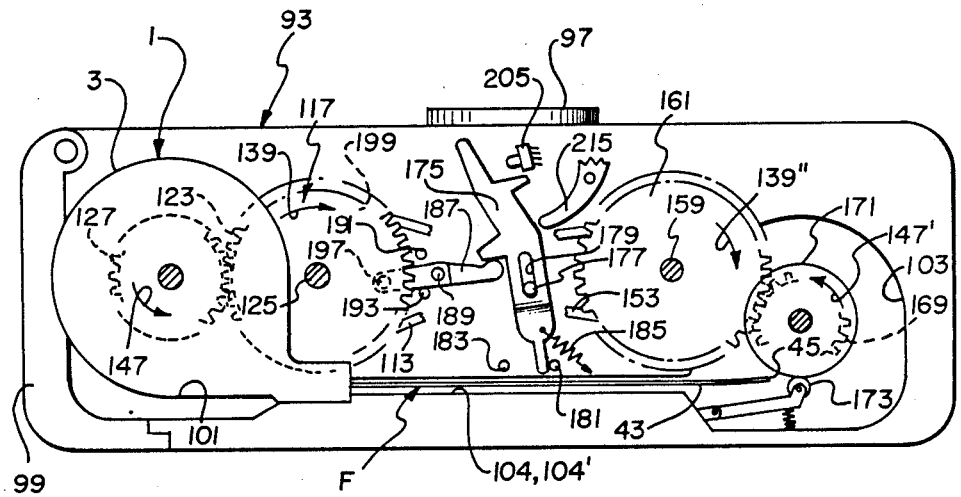
FIGS. 14-18 are bottom plan views similar to FIG. 12, depicting respective stages of operation of the metering control mechanism.
Figure 15:
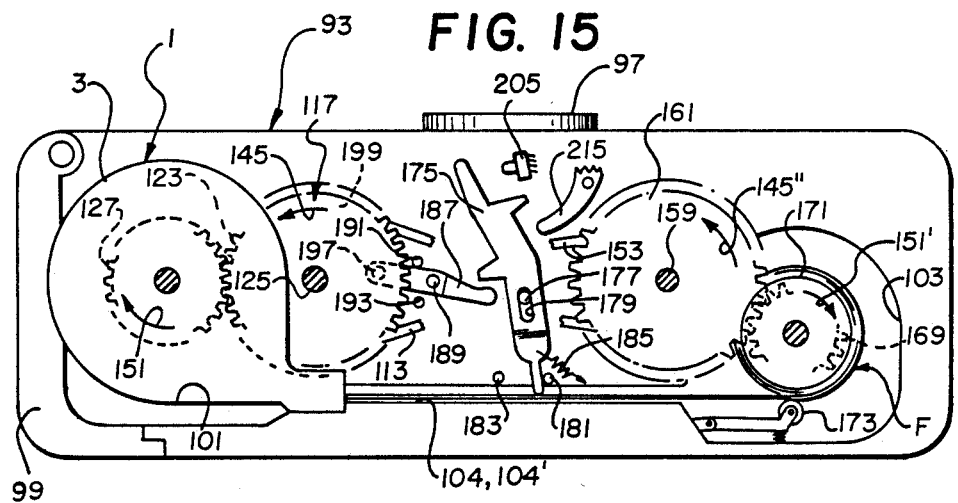
Figure 16:
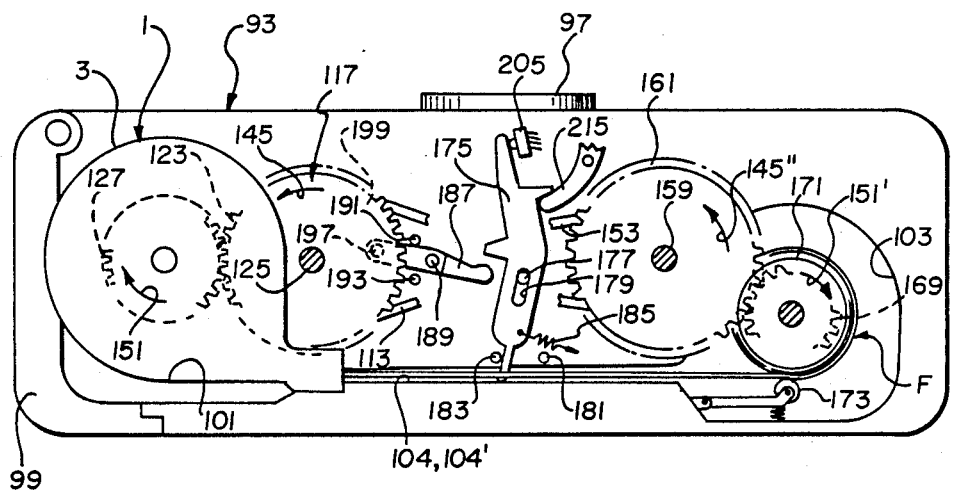

A metering pawl 175 adapted to engage the filmstrip F at its respective perforations P preparatory to each exposure is supported via a fixed pin 177, extending through a slot 179 in the pawl, for pivotal movement about the pin in opposite directions within the film path 104' between a sensing position shown in FIG. 15, for engaging the filmstrip at one of its metering perforations and a metered position, shown in FIG. 16, for preventing movement of the filmstrip back into the film cassette 1, and for movement in opposite directions generally transverse to the first-mentioned directions out of and into the film path as shown in FIGS. 14 and 15. A pair of stop pins 181 and 183 limit pivotal movement of the metering pawl 175 between its sensing and metered positions, and a tension spring 185 urges the pawl normally into the film path 104'. See FIG. 12.

Figure 13:
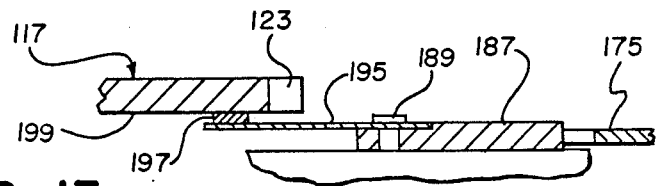
FIG. 13 is a cross-sectional view of the metering control mechanism as viewed in the direction of the arrows 13, 13 in FIG. 12.

A control lever 187 is supported via a pivot pin 189 for pivotal movement between a normal passive position, shown in FIGS. 15 and 16, for allowing the metering pawl 175 to be moved by the tension spring 185 to its sensing position in the film path 104' and an active position, shown in FIG. 14, for retaining the pawl out of the film path. A pair of stop pins 191 and 193 limit pivotal movement of the control lever 187 between its passive and active positions. The control lever 187 includes a leaf spring 195 having a slip-friction pad 197 which firmly abuts against a flat side 199 of the multiple gear unit 117. See FIGS. 8, 12, and 13. When the multiple gear unit 117 is rotated in the direction 139 as viewed in FIGS. 9 and 14, responsive to initial operation of the drive motor 105 to thrust the film leader 43 from the film cassette 1, to prewind the filmstrip F onto the take-up spool 171, the control lever 187 is pivoted from its passive position to its active position, thereby moving the metering pawl 175 from its sensing position in the film path 104' to thus prevent the pawl from engaging the filmstrip at any of its metering perforations P. Conversely, when the multiple gear unit 117 is rotated in the direction 145 as viewed in FIGS. 11 and 15, responsive to reverse operation of the drive motor 105 to rewind the filmstrip F into the film cassette 1, the control lever 187 is pivoted from its active position to its passive position, thereby allowing the tension spring 185 to return the metering pawl 175 to its sensing position in the film path 104'.

Figure 19:
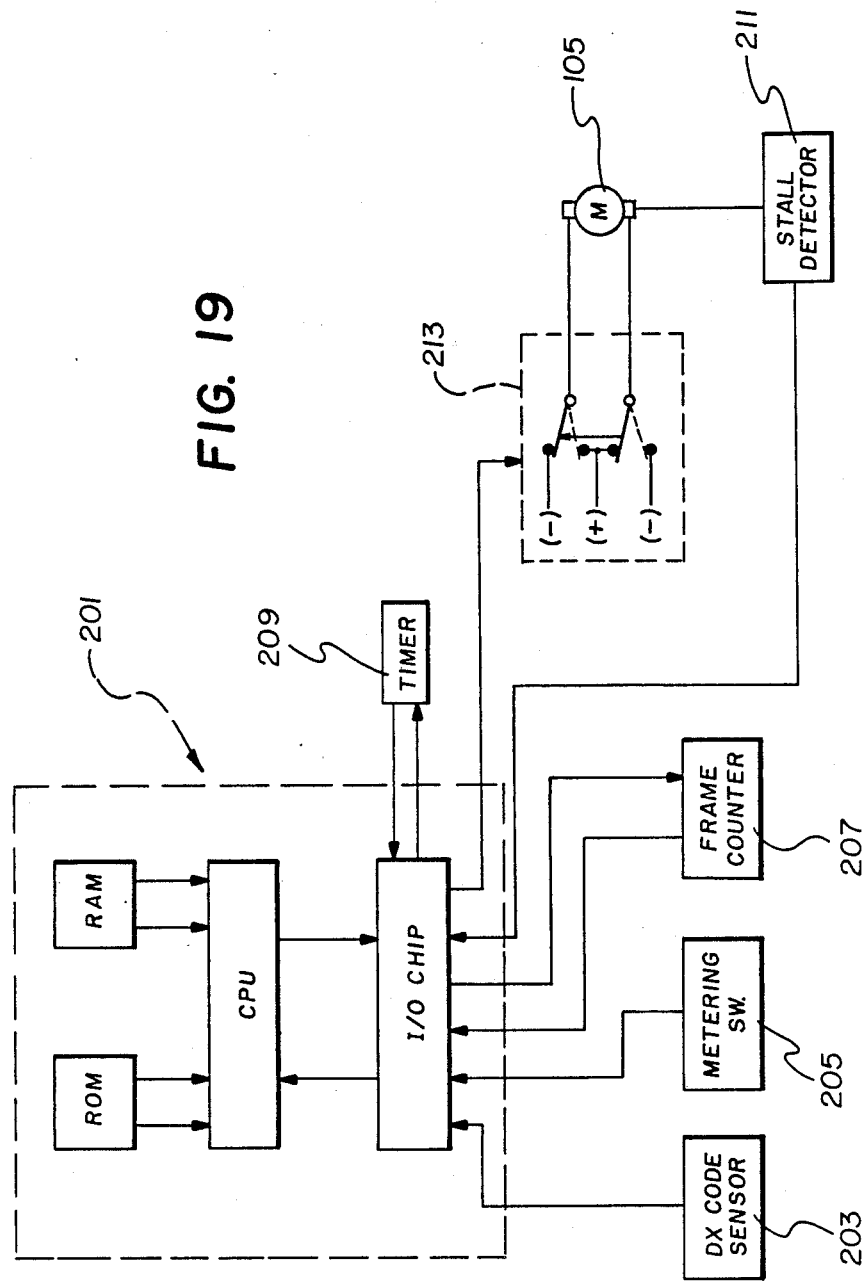
FIG. 19 is a schematic view of various electronic components including a conventional microcomputer for use with the metering control mechanism.

FIG. 19 shows a typical microcomputer 201 comprising a central processing unit CPU, a read-only memory ROM, a random access memory RAM, and an input-/output I/O chip, for use with other devices in the camera 93 to control the film transport apparatus 91. The other devices include a known DX code sensor 203 for reading into the microcomputer 201 a binary encodement on the film cassette 1 indicative of the total number of available frames (imaging areas) I on the filmstrip F; a normally open metering switch 205 which is adapted to be closed by the metering pawl 175 each time the pawl is pivoted from its sensing position, shown in FIG. 15, to its metered position, shown in FIG. 16; a known frame counter 207 which is incremented by the microcomputer 201 each time the metering switch is closed, to provide a visible indication to the photographer of the number of the specific frame in position for exposure; a known timer 209; a known motor stall detector 211 for determining that the drive motor 105 is stalled due to the sudden onset of film tension when substantially the entire length of the filmstrip F has been prewound from the film cassette 1 onto the take-up spool 171; and a double-pole double-throw (DPDT) switch 213 for changing the current flow direction to the drive motor to reverse the motor, to rotate the smaller and larger drive pulleys 109 and 111 in the counter-clockwise and clockwise directions 139' and 145' as viewed in FIGS. 9 and 11.

Figure 20:
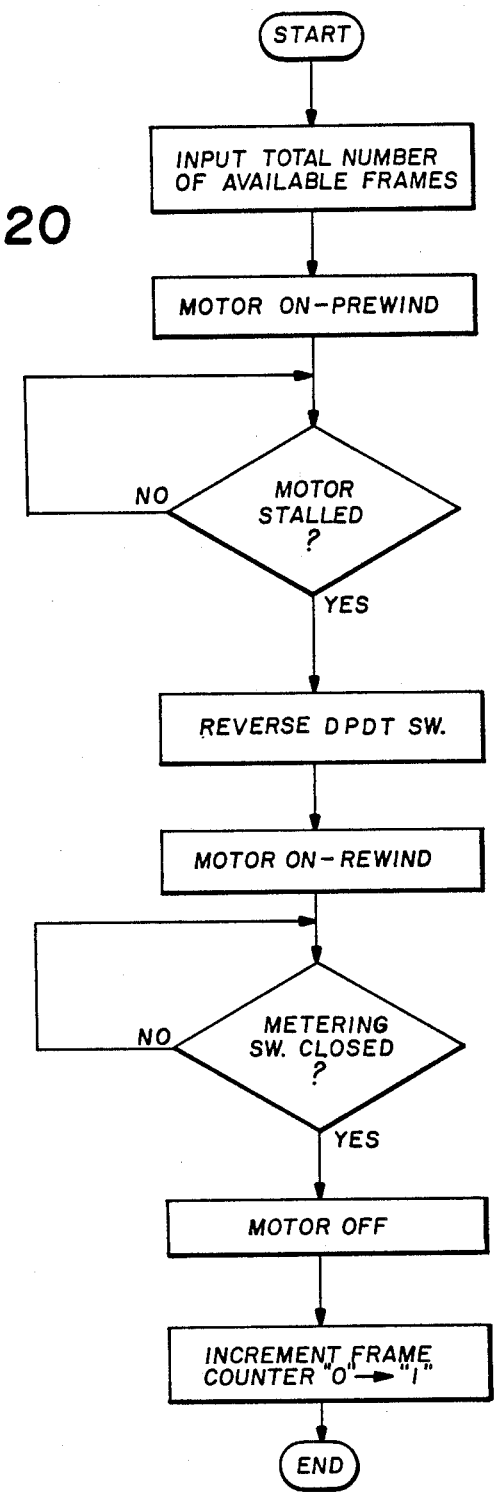
FIGS. 20 and 21 are flow charts for the microcomputer.

FIG. 20 depicts a first flow chart for the microcomputer 201. The sequential steps in this flow chart are as follows:

1. Read in the binary encodement on the film cassette 1 of the total number of available frames (imaging areas) I on the filmstrip 1;

2. Energize the drive motor 105 with a current flow direction to prewind the filmstrip F from the film cassette 1 onto the take-up spool 171. (Note the DPDT switch 213 is biased to the closed state for this current flow direction. See FIG. 19).

3. When the drive motor 105 is stalled by film tension as determined by the stall detector 209, reverse the DPDT switch 213 to energize the motor with a current flow direction to rewind the Filmstrip F back towards the film cassette 1.

4. When the metering switch 205 is closed the first time, de-energize the drive motor 105 and increment the frame counter 207 from "0" to "1". At this time, the first frame I will be in position for exposure.

Figure 17:
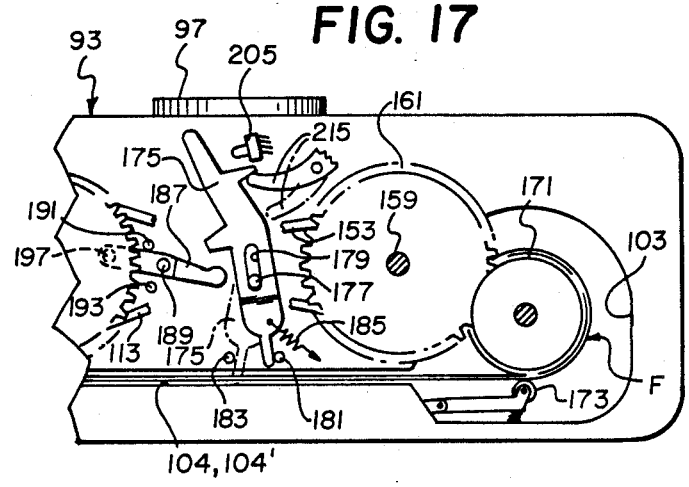
Figure 21:
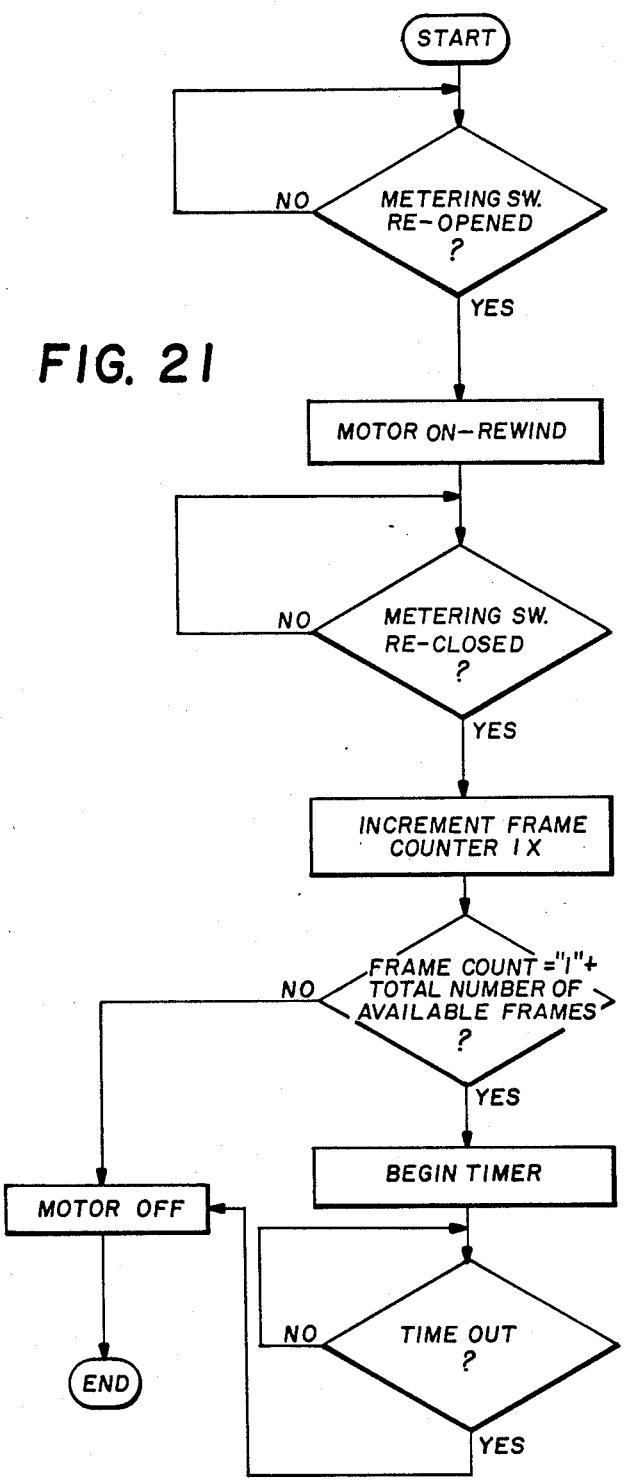

FIG. 21 depicts a second flow chart for the microcomputer 201. The sequential steps in this flow chart are as follows:

1. When the metering switch 205 is re-opened (because, as is customary, a known impact lever 215 has moved the metering pawl 175 from its metered position back to its sensing position following an exposure, as shown in FIG. 17), re-energize the drive motor 105 with the same current flow direction as in Step 3 for FIG. 20.

2. When the metering switch 205 is re-closed, increment the frame counter 207 by "1". At this time, another frame I will be in position for exposure.

3. Compare the frame count of the frame counter 207 with the binary encodement of the total number of available frames inputted at Step 1 for FIG. 20. If the frame count is greater (by "1") than the total number, i.e. the filmstrip F is substantially completely exposed, begin the timer 209 and go to the next step. If the frame counter is equal to or less than the total number, i.e. at least one frame I remains to be exposed, de-energize the drive motor 105 and do not go to the next step.

Figure 18:
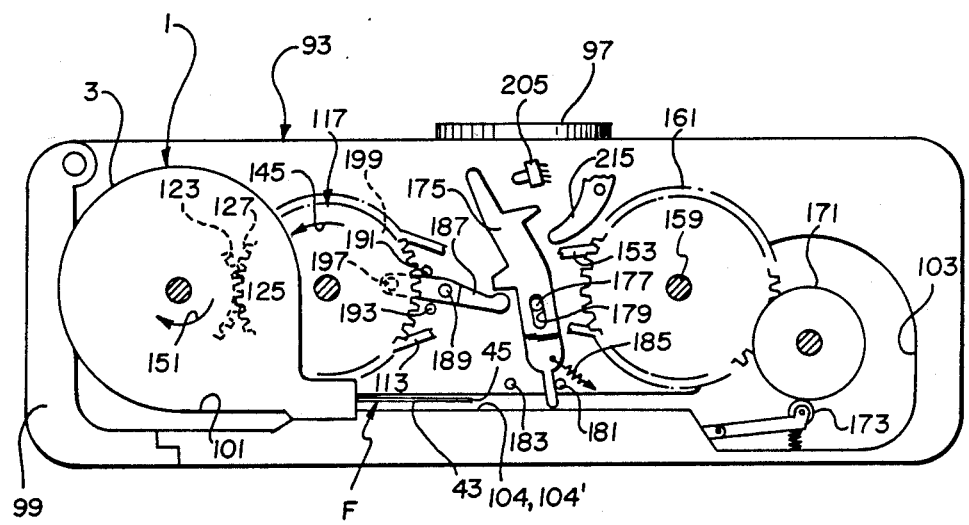

4. Since the drive motor 105 remains energized, the filmstrip F will continue to be rewound into the film cassette 1. See FIG. 18. When the timer 209 is timed out, the film leader 43 will have been rewound into the film cassette 1. Then, de-energize the drive motor 105 and allow the DPDT switch 213 to return to its normal state as shown in FIG. 19.

The invention has been described with reference to a preferred embodiment. However, it will be appreciated that variations and modifications can be effected with the ordinary skill in the art without departing from the scope of the invention. For example, the leading end 45 of the film leader 43, instead of initially being located as shown in FIG. 3, could be located in the film passage slit 25 of the film cassette 1 or could slightly protrude from the cassette. Thus, the term "non-protruding" as it refers to the film leader 43 in this application is meant to include "essentially non-protruding".

I claim:

1. A metering control mechanism for a photographic camera to be used with a film cassette in which a film spool is rotatable to unwind a filmstrip off the spool to thrust a non-protruding leader portion of the filmstrip from the cassette, to enable the leader portion to be moved along a film path to film take-up means in the camera, and alternatively to rewind the filmstrip onto the spool to draw the leader portion along the same path back into the cassette, wherein the camera includes a motorized film drive apparatus operable in a prewind mode for rotating the film spool to unwind the filmstrip off the spool and in a rewind mode for rotating the film spool to rewind the filmstrip onto the spool, characterized in that said metering control mechanism comprises:

a metering pawl adapted to engage the filmstrip at respective metering perforations preparatory to each exposure;

actuation means for moving said metering pawl into the film path to permit the pawl to engage the filmstrip at one of its metering perforations; and control means responsive to operation of said film drive apparatus in the prewind mode for removing said metering pawl from the film path to prevent the pawl from engaging the filmstrip at one of its metering perforations, and responsive to operation of said film drive apparatus in the rewind mode for allowing said metering pawl to be moved into the film path to permit the pawl to engage the filmstrip at one of its metering perforations.

2. A metering control mechanism as recited in claim 1, wherein said control means includes a control lever movable between a normal passive position for allowing said metering pawl to be moved into the film path and an active position for retaining the pawl out of the film path, said control lever having reversing means cooperating with said motorized film drive apparatus for moving the lever from its passive position to its active position responsive to operation of the film drive apparatus in its prewind mode and for moving the lever from its active position to its passive position responsive to change-over of the film drive apparatus from its prewind mode to its rewind mode.

3. A metering control mechanism as recited in claim 2, wherein said control lever is mounted to remove said metering pawl from the film path as the lever is moved from its passive position to its active position.

4. A metering control mechanism as recited in claims 1 or 2, wherein said metering pawl is movable in opposite directions within the film path between a sensing position for engaging the filmstrip at one of its metering perforations and a metered position for preventing movement of the filmstrip back into the cassette and is movable in opposite directions generally transverse to the first-mentioned directions into and out of the film path.

5. A metering control mechanism as recited in claim 4, wherein said actuation means includes biasing means for urging said metering pawl normally into the film path.

* * * * *